United States Patent [19]
Spoozak et al.

[11] Patent Number: 5,687,512
[45] Date of Patent: Nov. 18, 1997

[54] HURRICANE LOCKDOWN SYSTEM

[76] Inventors: Norman W. Spoozak, 904 Koko Isle Cr.; Richard L. Rudolph, 7525 Nakalele St., both of Honolulu, Hi. 96825

[21] Appl. No.: 646,857

[22] Filed: May 8, 1996

[51] Int. Cl.⁶ .................................................. E04B 7/00
[52] U.S. Cl. .................. 52/23; 52/4; 52/93.2; 52/94; 52/148; 52/156; 52/166; 52/DIG. 11
[58] Field of Search ................... 52/4, 23, 93.2, 52/148, 156, 166, DIG. 11, 94

[56] References Cited

U.S. PATENT DOCUMENTS

| | | | |
|---|---|---|---|
| 1,192,027 | 7/1916 | Acheson | 52/23 |
| 3,449,874 | 6/1969 | Beaupre. | |
| 4,560,131 | 12/1985 | Eck | 52/DIG. 11 X |
| 5,319,896 | 6/1994 | Winger. | |
| 5,355,640 | 10/1994 | Frye. | |
| 5,388,378 | 2/1995 | Frye. | |
| 5,491,935 | 2/1996 | Coxum | 52/23 X |
| 5,522,184 | 6/1996 | Oviedo-Reyes | 52/23 |
| 5,537,786 | 7/1996 | Lozier et al. | 52/23 |

*Primary Examiner*—Christopher T. Kent
*Attorney, Agent, or Firm*—Shlesinger, Arkwright & Garvey LLP

[57] ABSTRACT

A lockdown system for a low rise building including a roof structure with sheathing disposed over a plurality of roof rafters, the roof structure forming eaves around the periphery thereof, the system comprises a loop of rafter cable for being secured around the eaves of the roof; and a plurality of anchor cables operably secured to the rafter and to the ground, the anchor cables being adapted to exert a downward force on the rafter such that lift forces generated during high winds are counteracted.

21 Claims, 5 Drawing Sheets

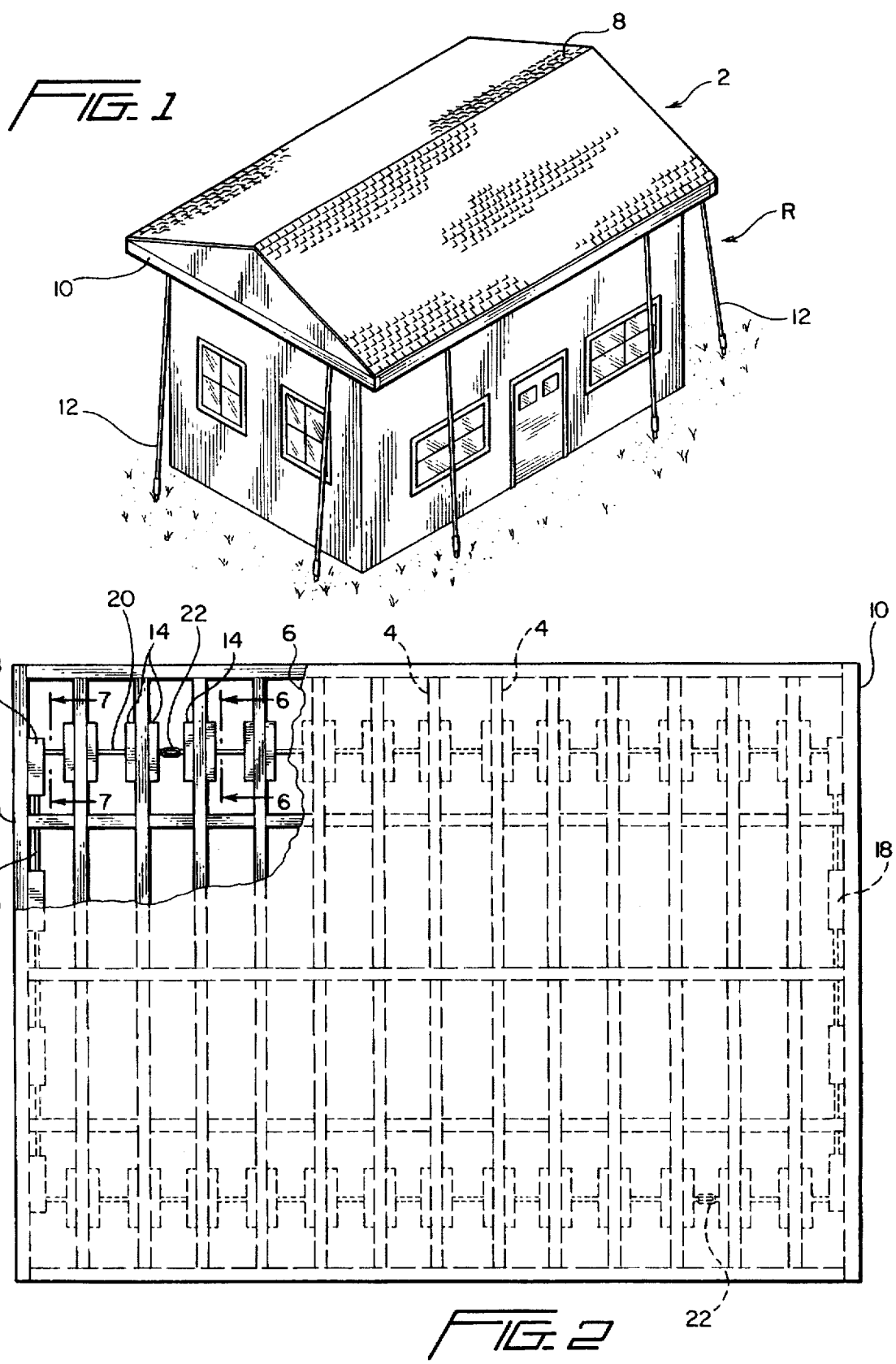

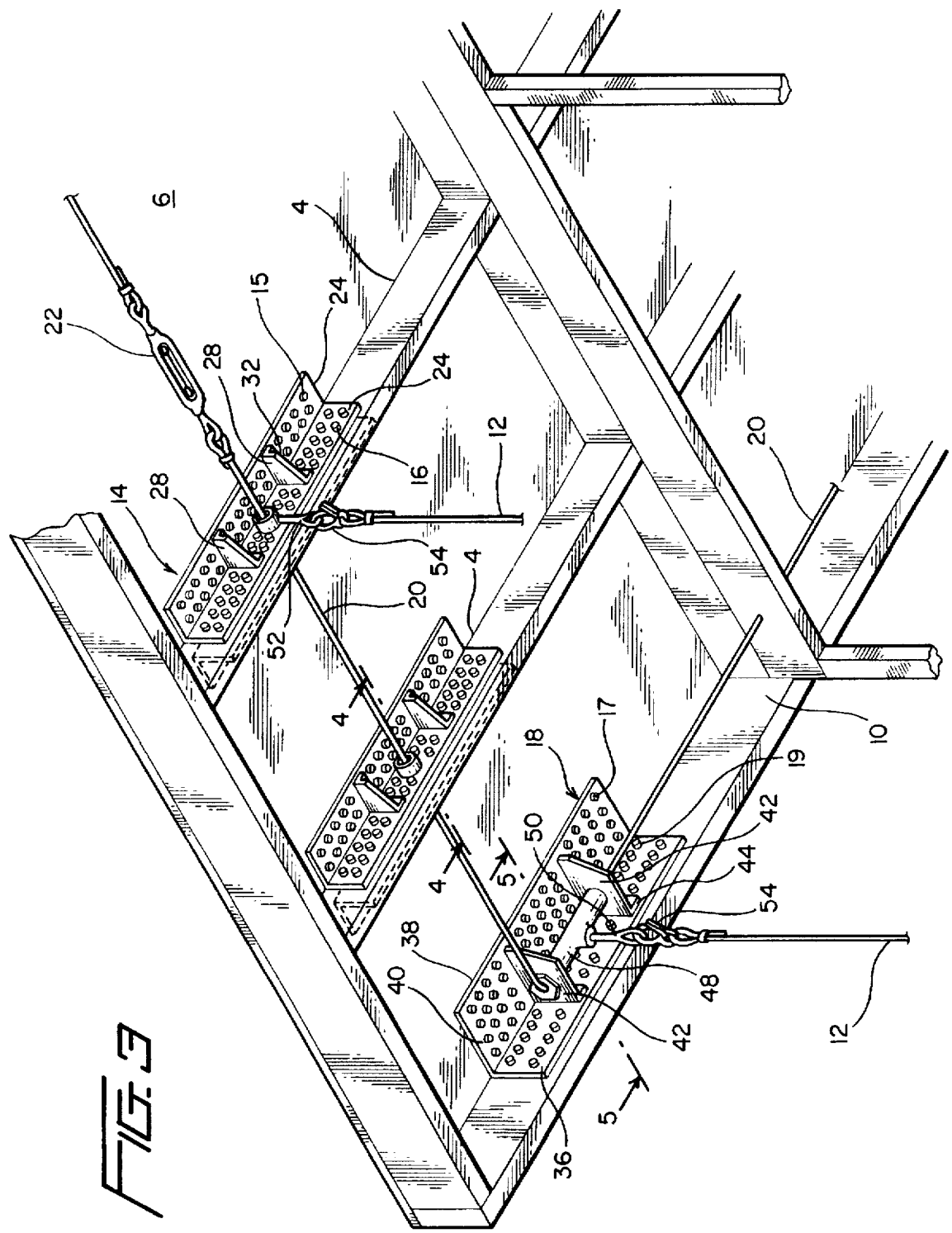

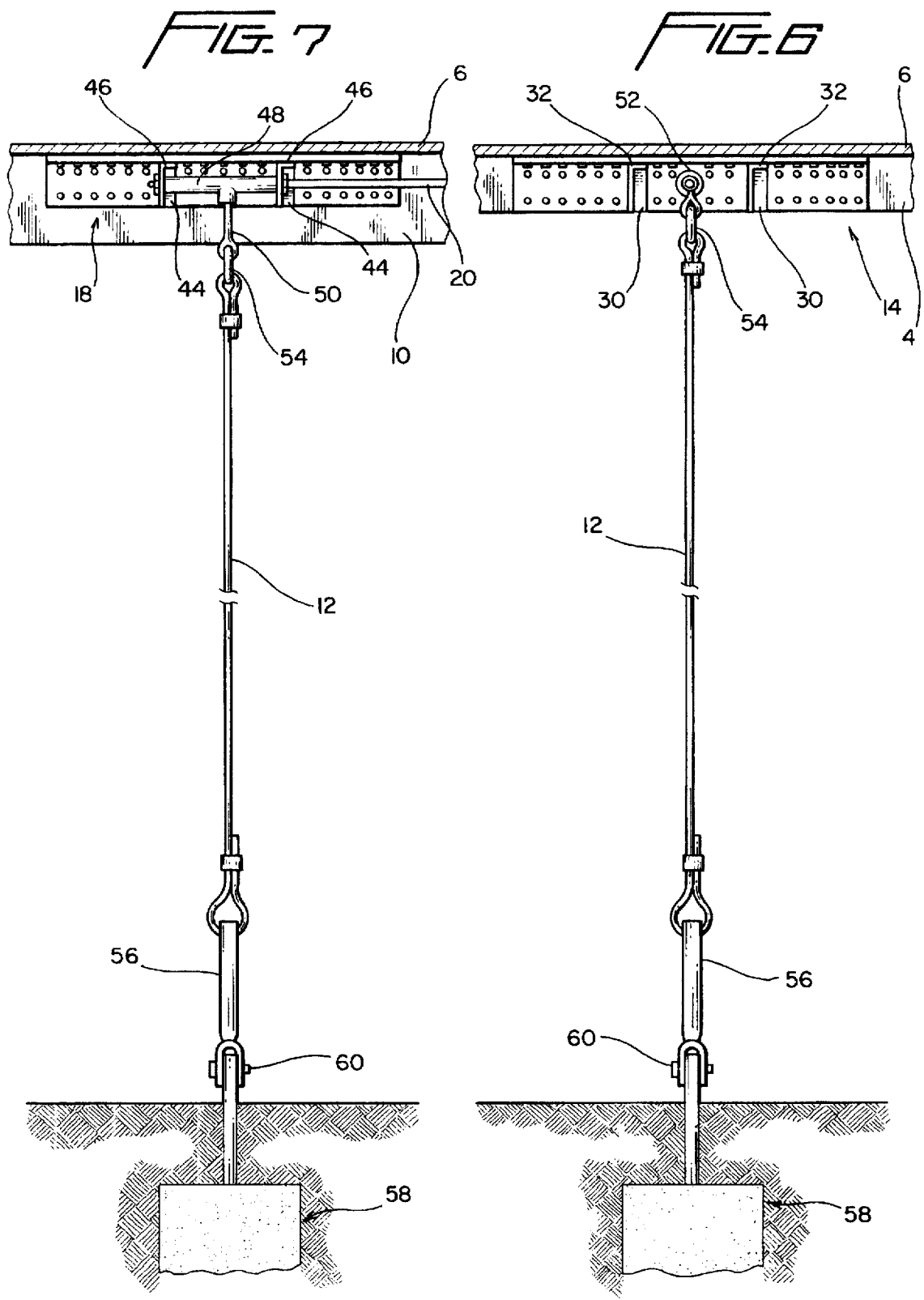

HURRICANE LOCKDOWN SYSTEM

FIELD OF THE INVENTION

The present invention relates to a hold-down system for anchoring the roof structure of a low rise building during a high wind situation. The present invention also relates to a system of brackets that provides additional reinforcements for an existing roof structure.

BACKGROUND OF THE INVENTION

It is well known what high winds can do to a building, particularly to a frame construction low rise structure. Generally, the roof suffers much of the damage sustained by the building.

The present invention provides a solution to the above problem by reinforcing and anchoring the eaves of the roof to the ground, wherein a downward force is applied to the roof to counter the lift forces generated by high winds.

OBJECTS AND SUMMARY OF THE INVENTION

It is an object of the present invention to provide a lockdown system for a roof structure of a low rise building that reinforces the roof against damage in a high wind situation, such as a hurricane.

It is another object of the present invention to provide a lockdown system for a frame construction building that provides a downward force around the periphery of the roof structure, thereby to better resist any upward lift imparted to the roof by high winds.

It is still another object of the present invention to provide a lockdown system for a low rise building that uses removable anchor cables to make the system relatively unobtrusive when not in use.

It is another object of the present invention to provide a lockdown system for a low rise building that provides reinforcement to the roof structure, thereby providing greater resistance to damage during high wind conditions.

It is yet another object of the present invention to provide a lockdown system for a low rise building that complies with the recommendation of the Universal Building Code, Schedule 25, relating to the complete load path.

In summary, the present invention provides a lockdown system for a low rise building including a roof structure with sheathing disposed over a plurality of roof rafters, the roof structure forming eaves around the periphery thereof. The system comprises a loop of rafter cable for being secured around the eaves of the roof; and a plurality of anchor cables operably secured to the rafter cable and to the ground, the anchor cables being adapted to exert a downward force on the rafter cable such that lift forces generated during high winds are counteracted.

These and other objects of the present invention will become apparent from the following detailed description.

BRIEF DESCRIPTIONS OF THE DRAWINGS

FIG. 1 is a perspective view of a low rise building structure using a lockdown system made in accordance with the present invention.

FIG. 2 is a top plan view of the roof structure of FIG. 1, with portion broken away, showing the rafter and gable brackets and the rafter cable as used in accordance with the present invention.

FIG. 3 is a fragmentary bottom perspective view of one corner of the roof structure of FIG. 1, showing the rafter and gable brackets and the rafter cable as used in accordance with the present invention.

FIG. 6 is a cross-sectional view taken along line 6—6 of FIG. 2.

FIG. 7 is a cross-sectional view taken along line 7—7 of FIG. 2.

DETAILED DESCRIPTION OF THE INVENTION

Figure 4:
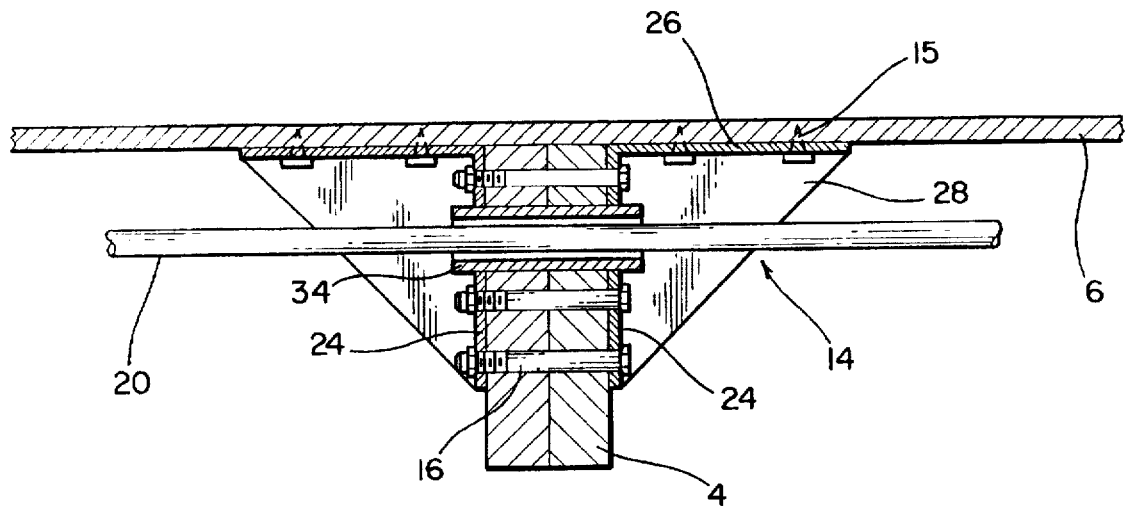
FIG. 4 is a cross-sectional view taken along line 4—4 of FIG. 3.
Figure 5:
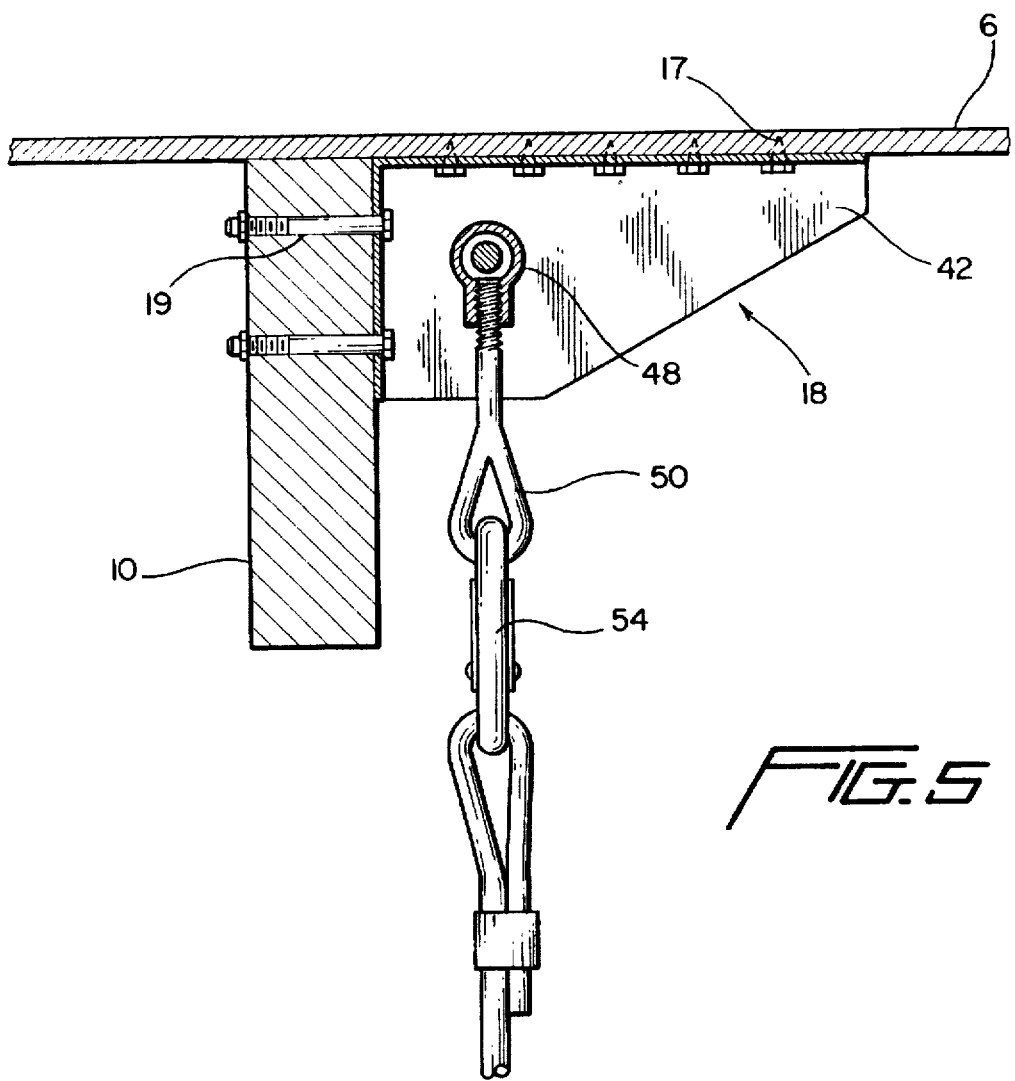
FIG. 5 is a cross-sectional view taken along line 5—5 of FIG. 3.

A lockdown system R made in accordance with the present invention used to anchor and hold down the roof structure 2 of a low-rise building is disclosed in FIG. 1. The roof structure 2 includes a plurality of rafters 4 supporting roof sheathing 6, which in turn supports roof shingles 8 or other standard roof coverings. The roof structure 2 is a pitched roof type with a gable 10 at each end of the roof.

Although the system R is disclosed as being used to hold down a pitched roof structure, it should be understood that the system R may also be used with other types of roof construction, such as hip roof, gable roof, flat roof, lean-to roof, rotunda roof, etc.

The system R includes a plurality of anchor cables 12 that are operably secured to the roof structure 2 and the ground, as best shown in FIG. 1. The cables 12 provide a downward force on the roof structure 2 to counter lift forces generated during a hurricane or other high wind situation, as will be explained below.

A plurality of rafter brackets 14 are used in pairs to sandwich the respective roof rafters 4, as best shown in FIGS. 2 and 3. Each pair of rafter brackets 14 are preferably installed every 48" to the roof rafters. Each rafter bracket 14 is secured to a respective rafter 4 and the roof sheathing 6 by epoxy glue and a plurality of lag bolts 15 and through-bolts 16, as best shown in FIG. 3. The rafter bracket 14 advantageously reinforces the existing roof structure, making it relatively resistant to damage during high winds.

A plurality of gable brackets 18 are secured to the gable 10 and the roof sheathing 6, preferably by epoxy glue and a plurality of lag bolts 17 and through-bolts 19, as best shown in FIGS. 2 and 3. The gable brackets 18 advantageously provide reinforcement to the gable portion of the existing roof and means for securing the anchor cables 12 thereto.

A rafter cable 20 is threaded through the rafter brackets 14 and the cable brackets 18 to form a continuous loop around the periphery or eaves of the roof structure 2, as best shown in FIGS. 2 and 3. A plurality of turnbuckles 22 provide means for tensioning or taking up the slack in the rafter cable 20. The anchor cables 12 are operably secured to the rafter cable 20, as best shown in FIG. 3. The rafter cable 20 advantageously distributes the downward force exerted by each anchor cable 12 around the periphery of the roof structure 2.

Each rafter bracket 14 is preferably made from sheet metal bent into a right angle to form a vertical wall 24 and a horizontal wall 26, as best shown in FIG. 3. The walls 24 and 26 are provided with a plurality of holes for receiving the lag bolts 15 and through-bolts 16 that are used to secure the vertical wall 24 to the rafter 4 and the horizontal wall 26 to the roof sheathing 6. A pair of reinforcing ribs 26 are secured to the walls 24 and 26 by standard means, such as by welding or the like. Each reinforcing rib 26 is preferably made from sheet metal and formed with vertical flange 30 and horizontal flange 32 that are secured to the respective walls 24 and 26.

A bearing pipe 34 is disposed through each pair of rafter brackets 14, as best shown in FIG. 4. The bearing pipe 34 is supported by the respective rafter 4 and the respective vertical walls 24 of the rafter brackets 14 and secured thereto by standard means. The pipe 34 advantageously provides a bearing surface for the cable 20 to distribute the downward force exerted by the anchor cables 12 over a larger area, as best shown in FIG. 4.

Each gable bracket 18 is preferably formed from sheetmetal and bent at right angle to provide a vertical wall 36 and a horizontal wall 38, as best shown in FIG. 3. The walls 36 and 38 are provided with a plurality of holes for receiving the lag bolts 17 and through-bolts 19 that are used to secure the vertical of wall 36 to the gable 10 and the horizontal wall 38 to the roof sheathing 6. A pair of reinforcing ribs 42 are secured to the walls 36 and 38, as best shown in FIG. 3. Each reinforcing rib 42 is preferably formed from sheetmetal and provided with a vertical flange 44 and horizontal flange 46 that are secured to the respective walls 36 and 38 by standard means, such as by welding or the like, as best shown in FIG. 7.

A bearing pipe 48 is supported between each pair of ribs 42, as best shown in FIGS. 3 and 7. The pipe 48 includes an eye bolt 50 that is used to secure the ground cable 12 to the gable bracket 18.

A plurality of eye-bolts 52 are secured to some or all of the bearing pipes 34 and are provided to connect the ground cables 12 to the rafters 4, as best shown in FIG. 3. The connection points advantageously provides a downward force on the rafters 4 around the eaves of the roof structure 2.

Hooks 54 operably secured to respective ground cables 12 are used to removably secure each of the ground cable 12 to the eye bolts 50 and 52. Turnbuckles 56 are provided for tensioning the respective ground cables 12. Standard ground anchors 58 secure the ground cables 12. Each turnbuckle 56 is removably secured to the ground anchor 58 by standard means 60 such that the anchor cables 12 can be stowed away when not in use during normal conditions. In this manner, the anchor cables 12 are advantageously out of the way. The anchor cables 12 can be installed relatively quickly in advance of a storm.

The turnbuckles 56 are used to provide tension to the respective anchor cables 12. The tension on the anchor cables 12 are transferred to the rafter cable 20 to effectively provide a downward force on the roof structure 2.

Figure 8:
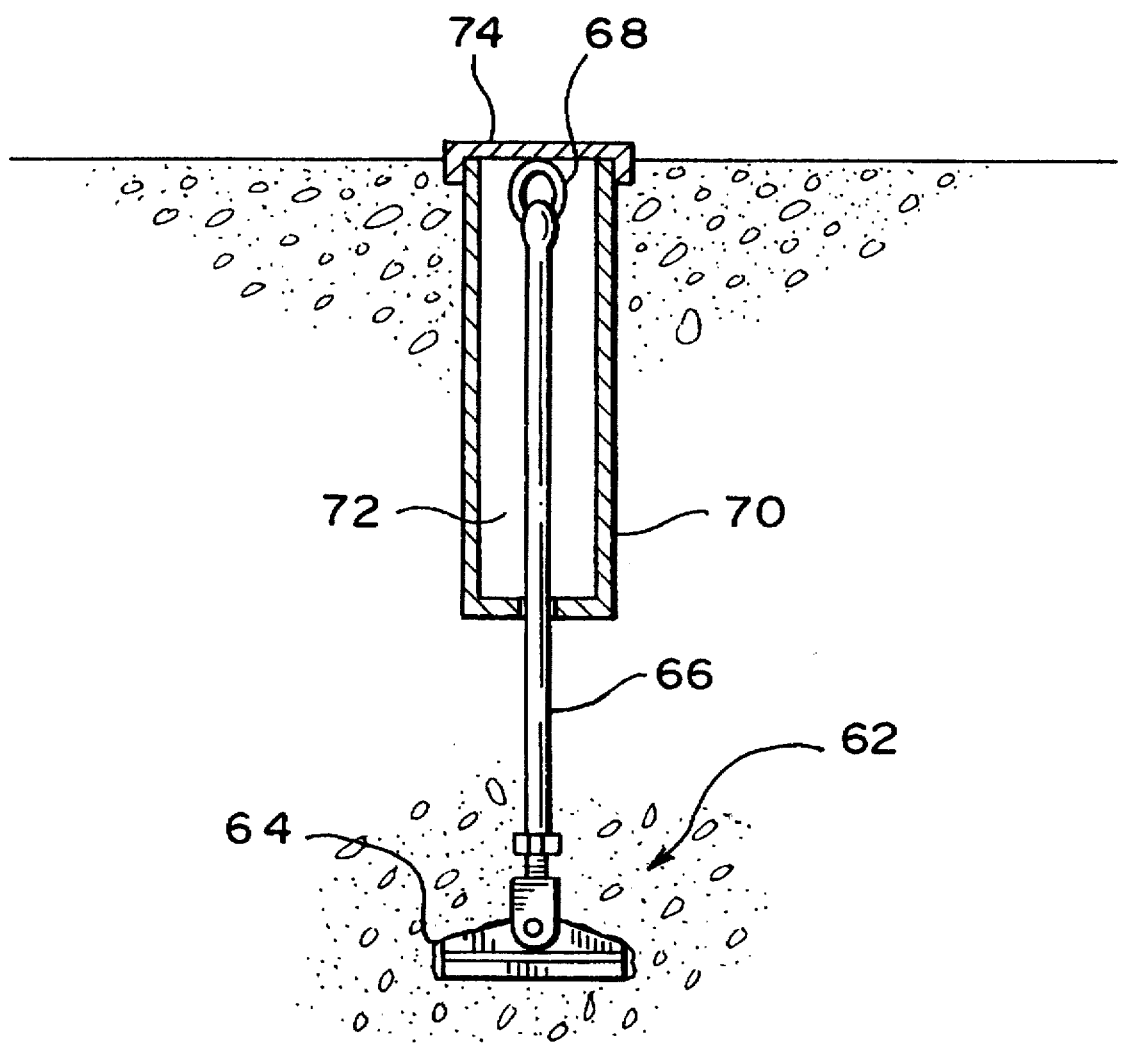
FIG. 8 is a cross-sectional view of a ground anchor incorporating a cable storage used in the present invention.

Another ground anchor assembly 62 used in the present invention is disclosed in FIG. 8. The assembly 62 is a available from Manta-Ray Corporation, Denver, Colo. The assembly includes an anchor 64 and a rod 66 attached thereto. A ring 68 is disposed at the end of the rod 66 for securing the anchor cable 12. A pipe 70, buried in the ground with the rod 66, provides a storage space 72 for the anchor cable 12 when the cable is not in use. A removable cap 74 provides access to the storage 72.

While this invention has been described as having preferred design, it is understood that it is capable of further modification, uses and/or adaptations of the invention following in general the principle of the invention and including such departures from the present disclosure as come within known or customary practice in the art to which the invention pertains, and as may be applied to the essential features set forth, and fall within the scope of the invention or the limits of the appended claims.

We claim:

1. A lockdown system for a low rise building including a roof structure with sheathing disposed over a plurality of roof rafters, the roof structure forming eaves around a periphery thereof, said system comprising:
   a) a rafter cable for being secured around the eaves of the roof structure;
   b) a plurality of anchor cables operably secured to said rafter cable and for being secured to the ground, said anchor cables being under tension such that lift forces generated during high winds are counteracted;
   c) a plurality of brackets for being secured to the roof rafters in the eaves;
   d) a plurality of pipe members being secured to said brackets and for being secured to the roof rafters; and
   e) said rafter cable being threaded through said pipe members.

2. A system as in claim 1, and further comprising:
   a) a turnbuckle secured in series with said rafter cable.

3. A system as in claim 1, wherein:
   a) each of said brackets includes a vertical wall for being secured to each of the plurality of roof rafters and a horizontal wall for being secured to the roof sheathing.

4. A system as claim 1, wherein:
   a) said anchor cables are removably secured to said rafter cable.

5. A roof structure for a low rise building, comprising:
   a) a plurality of roof rafters forming an overhang around a periphery thereof;
   b) roof sheathing secured to said rafters;
   c) a loop of rafter cable secured around said overhang;
   d) a plurality of anchor cables operably secured to said rafters and for being operably secured to the ground, said anchor cables being adapted to exert a downward force on said rafters such that lift forces generated during high winds are counteracted;
   e) a plurality of brackets secured to said rafters along eaves of the roof structure; and
   f) said rafter cable being operably secured to said brackets.

6. A roof structure as in claim 5, wherein:
   a) each bracket is secured by a plurality of fasteners to said rafters and sheathing.

7. A system as in claim 6, wherein:
   a) each bracket is secured with epoxy glue to said rafters and sheathing.

8. A roof structure, comprising:
   a) an overhang including rafters disposed around a periphery of said roof structure;
   b) plurality of brackets each operably secured to said rafters;
   c) a rafter cable disposed along the length of said overhang and operably secured to said brackets; and
   c) at least one ground cable operably secured to said rafter cable and the ground such that the roof of the structure is held down during a storm.

9. A roof structure as in claim 8, wherein:
   a) each bracket comprises first and second walls disposed transversely to each other.

10. A roof structure as in claim 9, wherein:
    a) each bracket includes a reinforcement member secured to said first and second walls.

11. A roof structure as in claim 9, and further comprising:

a) a pipe member operably secured in the rafters through each bracket; and b) said rafter cable is threaded through said pipe member.

12. A system as in claim 11, and further comprising:

a) an eyebolt secured to said pipe member.

13. A system as in claim 8, and further comprising:

a) a plurality of gable brackets for securing to a gable and sheathing of said roof structure; and b) said gable brackets are operably secured to said rafter cable.

14. A system as in claim 13, wherein:

a) each gable bracket comprises first and second walls disposed transversely to each other.

15. A system as in claim 14, wherein:

a) each gable bracket includes first and second reinforcement members secured to said first and second walls and spaced apart from each other.

16. A system as in claim 15, wherein:

a) each gable bracket includes a pipe member disposed between said first and second reinforcement members; and b) said rafter cable is operably secured to said pipe member.

17. A system as in claim 16, wherein:

a) said pipe member includes an eyebolt for securing to said ground cable.

18. A system as in claim 8, and further comprising:

a) a turnbuckle secured to ends of said rafter cable and adapted to provide tension to said cable.

19. A system as in claim 8, and further comprising:

a) a turnbuckle secured to ends of said at least one ground cable and adapted to provide tension to said at least one ground cable.

20. A system as in claim 8, wherein:

a) said at least one ground cable is removable when not in use.

21. A system as in claim 20, and further comprising:

a) a pipe adapted to be buried in the ground for storage of said at least one ground cable when not in use.

* * * * *